(12) United States Patent
Newstadt et al.

(10) Patent No.: US 8,495,716 B1
(45) Date of Patent: Jul. 23, 2013

(54) SYSTEMS AND METHODS FOR FACILITATING ONLINE AUTHENTICATION FROM UNTRUSTED COMPUTING DEVICES

(75) Inventors: Keith Newstadt, Newtown, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1362 days.

(21) Appl. No.: 11/967,473

(22) Filed: Dec. 31, 2007

(51) Int. Cl.
*H04L 29/06* (2006.01)

(52) U.S. Cl.
USPC ............ 726/7; 726/2; 726/5; 726/9; 713/182; 713/185

(58) Field of Classification Search
USPC ............................................ 726/7
See application file for complete search history.

(56) References Cited

U.S. PATENT DOCUMENTS

| | | | |
|---|---|---|---|
| 7,028,033 B2* | 4/2006 | Bright et al. ........................ | 1/1 |
| 7,430,758 B2* | 9/2008 | Toutonghi ......................... | 726/5 |
| 2007/0289002 A1* | 12/2007 | van der Horst et al. ........... | 726/9 |
| 2008/0109657 A1* | 5/2008 | Bajaj et al. ..................... | 713/168 |

OTHER PUBLICATIONS

Andreas Pashalidis and Chris J. Mitchell, Impostor: A Single Sign-On System for Use from Untrusted Devices, IEEE Communication Society, Globecom 2004. vol. 4 (pp. 2191-2195).*
R. C. Jammalamadaka et al. "Delegate: A Proxy Based Architecture for Secure Website Access from an Untrusted Machine." $22^{nd}$ Annual Computer Security Applications Conference, 2006 [ACSAC '06].*

* cited by examiner

*Primary Examiner* — Taghi Arani
*Assistant Examiner* — Narciso Victoria
(74) *Attorney, Agent, or Firm* — ALG Intellectual Property, LLC

(57) ABSTRACT

A computer-implemented method for facilitating online authentication from untrusted computing devices may comprise receiving a request to access an online service from a computing device, retrieving authentication information for the online service from a database, accessing the online service using the authentication information for the online service, receiving data from the online service, and transmitting at least a portion of the data received from the online service to the computing device. The method may also comprise converting the authentication information for the online service into non-computer-readable authentication information, such as a human-readable image, and transmitting the non-computer-readable authentication information to the computing device. Corresponding systems and computer-readable media are also disclosed.

17 Claims, 10 Drawing Sheets

SYSTEMS AND METHODS FOR FACILITATING ONLINE AUTHENTICATION FROM UNTRUSTED COMPUTING DEVICES

BACKGROUND

Over the years, the popularity of online services, such as websites, web-based email services, and file distribution services, has grown dramatically. In addition to providing other services, online services may enable users to access a variety of information or perform a variety of tasks from connected computing devices around the world.

In order to prevent unauthorized access to the services offered by these online services, online services typically require users to present login or authentication information, such as a username and a password. Because individuals are often users of multiple online services, a single individual may be required to remember a number of usernames and/or passwords. This may lead users to insecurely store passwords on their computer (such as in an unencrypted text file), write passwords on insecurely stored paper (oftentimes attached to or left in the vicinity of the user's computer), or choose identical passwords for multiple online services.

Prior attempts to solve this problem have involved storing users' passwords or login information in a remote device or database, such as an online password vault. Users may access online services that require authentication by retrieving password or login information from such an online password vault and then using the retrieved login information to log into the online service.

In many cases, a user may access such an online password vault from an untrusted computing device, such as a public kiosk or a friend's computer. Unfortunately, accessing this login information from the untrusted machine exposes this sensitive information to theft. This danger is problematic, both for providers and users of online services.

SUMMARY

As will be described in greater detail below, embodiments of the instant disclosure may enable a user to securely access online services from an untrusted computing device, such as a public kiosk. For example, in one embodiment a computer-implemented method for facilitating online authentication from an untrusted computing device may comprise receiving a request to access an online service from the untrusted computing device, retrieving authentication information for the online service from a database, accessing the online service using the authentication information for the online service, receiving data from the online service, and transmitting at least a portion of the data received from the online service to the untrusted computing device.

In at least one embodiment, a proxy server may perform one or more of the above-identified steps. In this example, the proxy server may proxy traffic between the untrusted computing device and an online service by, for example, embedding web pages retrieved from the online service within a sub frame and then transmitting the embedded web page to the untrusted computing device. In certain embodiments, a user may be required to present user-account authentication information, such as multi-factor authentication information, to the proxy server (or the database containing the user's online-service authentication information) prior to being granted access.

Embodiments of the instant disclosure may also enable a user to securely retrieve login authentication information using an untrusted computing device. For example, in one embodiment a computer-implemented method for securely providing authentication information for an online service to an untrusted computing device may comprise receiving a request from an untrusted computing device to obtain authentication information for an online service, retrieving the authentication information for the online service in computer-readable format from a database, converting the computer-readable authentication information for the online service into non-computer-readable authentication information, and then transmitting the non-computer-readable authentication information to a computing device.

In one example, converting the computer-readable authentication information into non-computer-readable authentication information may involve converting computer-readable text into a human-readable image, such as a bitmap, that displays authentication information in a human-readable format that is unreadable by a computing device or a software application. In addition, the method may further comprise adding visual noise to the human-readable image and/or transforming at least a portion of the human-readable image. The human-readable image may be transformed by rotating at least a portion of the human-readable image, stretching at least a portion of the human-readable image, and/or tilting at least a portion of the human-readable image.

Embodiments of the instant disclosure may also include providing a website that allows a user to request non-computer-readable authentication information for an online service, request access to an online service, and/or add, edit, or delete authentication information for an online service. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
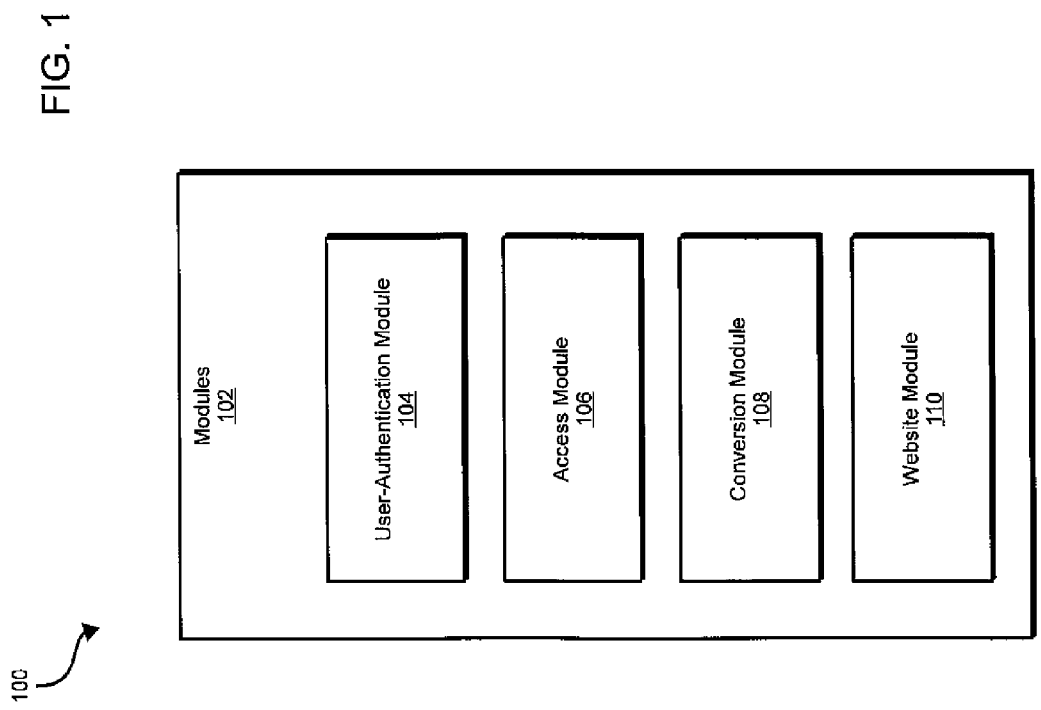
FIG. 1 is a block diagram of an exemplary system for facilitating online authentication from untrusted computing devices according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, embodiments of the instant disclosure may enable a user to securely access online services from an untrusted computing device, such as a public kiosk. For example, in one embodiment a computer-implemented method for facilitating online authentication from an untrusted computing device may comprise receiving a request to access an online service from the untrusted computing device, retrieving authentication information for the online service from a database, accessing the online service using the authentication information for the online service, receiving data from the online service, and transmitting at least a portion of the data received from the online service to the untrusted computing device.

The following will provide, with reference to FIGS. 1-2, 4, 6, and 8, a detailed description of exemplary systems for facilitating online authentication from an untrusted computing device and for providing authentication information for online services to an untrusted computing device. Detailed descriptions of corresponding exemplary computer-implemented methods will also be provided in connection with FIGS. 3, 5, and 7.

FIG. 1 is a block diagram of an exemplary system 100 for facilitating online authentication from untrusted computing devices. As illustrated in this figure, exemplary system 100 may comprise one or more modules 102 for performing one or more tasks required to facilitate online authentication from untrusted computing devices. For example, exemplary system 100 may comprise a user-authentication module 104 for authenticating a user of a computing device, as will be described in greater detail below.

As will be described in greater detail below, exemplary system 100 may also comprise an access module 106 for receiving a request to access an online service from a computing device, retrieving authentication information for the online service from a database, accessing the online service using the authentication information for the online service, receiving data from the online service, and transmitting data receiving from the online service to the computing device. Exemplary system 100 may also comprise a conversion module 108 for converting authentication information for the online service into non-computer-readable authentication information. In addition, exemplary system 100 may comprise a website module 110 for providing a website that allows a user to request non-computer-readable authentication information for an online service, request access to an online service, and/or add, edit, or delete authentication information for an online service.

As illustrated in FIG. 1, exemplary system 100 may also comprise at least one database 112. In at least one embodiment, and as will be described in greater detail below, authentication information for online services may be stored in database 112. This authentication information may be stored in database 112 in both non-computer-readable format and computer-readable format. Database 112 may also store information obtained from online services, as will be described in greater detail below. Although illustrated as a single device, database 112 may represent portions of a plurality of databases or computing devices.

In certain embodiments, one or more of modules 102 may represent one or more software applications or programs that, when executed by a computing device, may cause the computing device to perform one or more tasks required to facilitate online authentication from untrusted computing devices. For example, as will be described in greater detail below, one or more of modules 102 may represent software modules configured to run on one or more computing devices, such as server 208 in FIG. 2. One or more of modules 102 may also represent all or portions of one or more special-purpose computers configured to perform one or more tasks necessary to facilitate online authentication from untrusted computing devices.

In addition, database 112 may represent a portion of one or more computing devices. For example, database 112 may represent a portion of server 208 in FIG. 2. Alternatively, database 112 may represent one or more physically separate devices capable of being accessed by a computing device, such as server 208 in FIG. 2.

Figure 2:
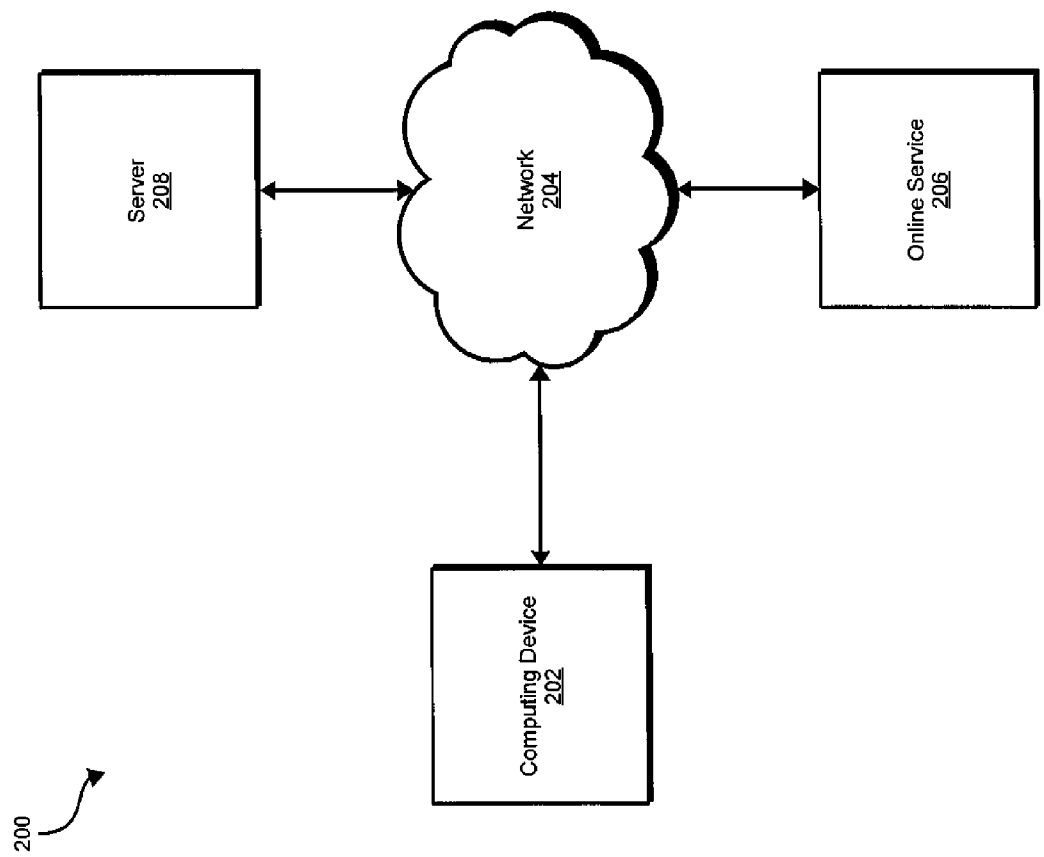
FIG. 2 is a block diagram of an exemplary network-based system for facilitating online authentication from untrusted computing devices according to certain embodiments.

Exemplary system 100 in FIG. 1 may be deployed in a variety of ways. For example, all or a portion of exemplary system 100 may represent portions of a network-based system. FIG. 2 is an illustration of an exemplary network-based system 200 for facilitating online authentication from untrusted computing devices. As illustrated in this figure, exemplary system 200 may comprise a computing device 202 in communication with an online service 206 and a server 208 via a network 204.

Computing device 202 generally represents any type or form of device capable of executing computer-readable instructions. In one embodiment, computing device 202 may represent an untrusted computing device. The phrase "untrusted computing device" generally refers to a computing device that may contain code that is potentially harmful to a system. For example, computing device 202 may represent a computing device accessed by a user in a public environment, such as a library or café. In this example, the public computing device may contain malicious code, such as malware, designed to extract sensitive personal data from the computing device. In certain embodiments, computing device 202 may comprise one or more portions of exemplary system 100 in FIG. 1. For example, one or more of modules 102 from FIG. 1 may be stored and configured to run on computing device 202. Similarly, computing device 202 may comprise database 112 in FIG. 1.

In at least one embodiment, computing device 202 may communicate with online service 206 and server 208 via network 204. Network 204 generally represents any type of communication or computing network; including, for example, an intranet, a wide area network (WAN), a local area network (LAN), a personal area network (PAN), or the Internet.

Online service 206 generally represents any type or form of online service. Examples of online services include, without limitation, websites (such as online banking websites), web-based email services, instant messaging services, file distribution services, or any other online service. Although not illustrated, in certain embodiments online service 206 may comprise at least one computing device (such as a server) for providing services to computing devices operated by one or more users of online service 206. Online service 206 may also comprise one or more databases for storing user-account data. The phrase "user-account data" generally refers to data associated with a user or a participant of online service 206. Examples of the type of data that may be associated with a user of online service 206 include, without limitation, user-login information, user-account-settings information, or any other form of data associated with the user of the online service.

As illustrated in FIG. 2, exemplary system 200 may also comprise a server 208. Server 208 generally represents any type or form of server-side computing devices. In certain embodiments, server 208 may comprise one or more portions of exemplary system 100 in FIG. 1. For example, one or more of modules 102 from FIG. 1 may be stored and configured to run on server 208. Similarly, server 208 may comprise database 112 in FIG. 1.

As will be described in greater detail below, exemplary system 200 may enable a user of an untrusted computing device, such as computing device 202 in FIG. 2, to securely access an online service, such as online service 206 in FIG. 2. For example, server 208 may, upon authenticating a user of computing device 202, access online service 206 using authentication information associated with the user of computing device 202 and then proxy communications between online service 206 and computing device 202 without revealing sensitive authentication information to computing device 202.

Figure 3:
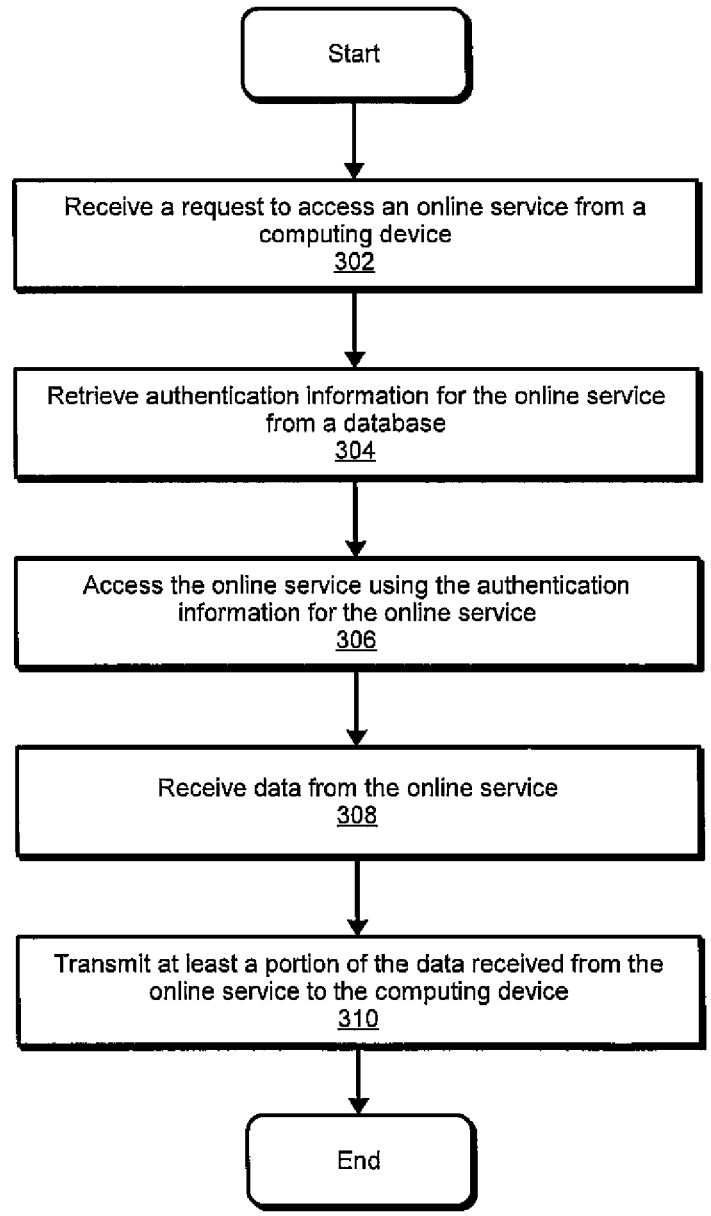
FIG. 3 is an illustration of an exemplary computer-implemented method for facilitating online authentication from untrusted computing devices according to certain embodiments.

FIG. 3 is a flow diagram of an exemplary computer-implemented method 300 for facilitating online authentication from untrusted computing devices. As will be explained in greater detail below, in this embodiment a user of an untrusted computing device, such as computing device 202 in FIG. 2, may access an online service, such as online service 206 in FIG. 2, without exposing sensitive authentication information to untrusted computing device 202.

As illustrated in FIG. 3, at step 302 a request to access an online service may be received from a computing device. For example, with reference to FIG. 2, server 208 may receive a request to access online service 206 from computing device 202 via network 204. At step 304, authentication information for the online service may be retrieved from a database. The phrase "authentication information" generally refers to information that may be used to establish or confirm the authenticity of a device or a user. In this example, authentication information for an online service, such as online service 206, may comprise login information required to access a user account of the online service. Accordingly, step 304 may comprise retrieving authentication information from a database, such as database 112, for a user of a user account associated with online service 206, such as a user of computing device 202.

At step 306, the authentication information for the online service retrieved from the database in step 304 may be used to access the online service. Online services may be accessed in a variety of ways. For example, in certain embodiments, accessing the online service at step 306 may comprise logging into the online service using the authentication information for the online service. In certain embodiments, an access module, such as access module 106 in FIG. 1, may be used to access the online service. For example, access module 106 in FIG. 1 may cause server 208 in FIG. 2 to retrieve authentication information associated with the user account of online service 206 from database 112 in FIG. 1 and then use this authentication information to log into the user account associated with online service 206.

At step 308, data may be received from the online service. Any type or form of information or data may be received from the online service; including, for example, both computer-readable and human-readable data. This information or data may also be received in a variety of ways. In one embodiment, receiving data from the online service may comprise retrieving a web page from the online service. For example, server 208 in FIG. 2 may, upon logging into a user account associated with online service 206, retrieve a web page from online service 206.

In at least one embodiment, receiving information or data from the online service may comprise receiving user-account data associated with the user account of the online service. As detailed above, examples of user-account data may include, without limitation, user-login information, user-account-settings information, or sensitive personal data, such as online banking information for a user, email or instant messages sent or received by a user, contact records containing contact information for friends, family members, or acquaintances of the user, or any other form of potentially relevant data. For example, server 208 in FIG. 2 may, upon logging into a user account associated with online service 206, retrieve online banking information for a user from online service 206.

Figure 4:
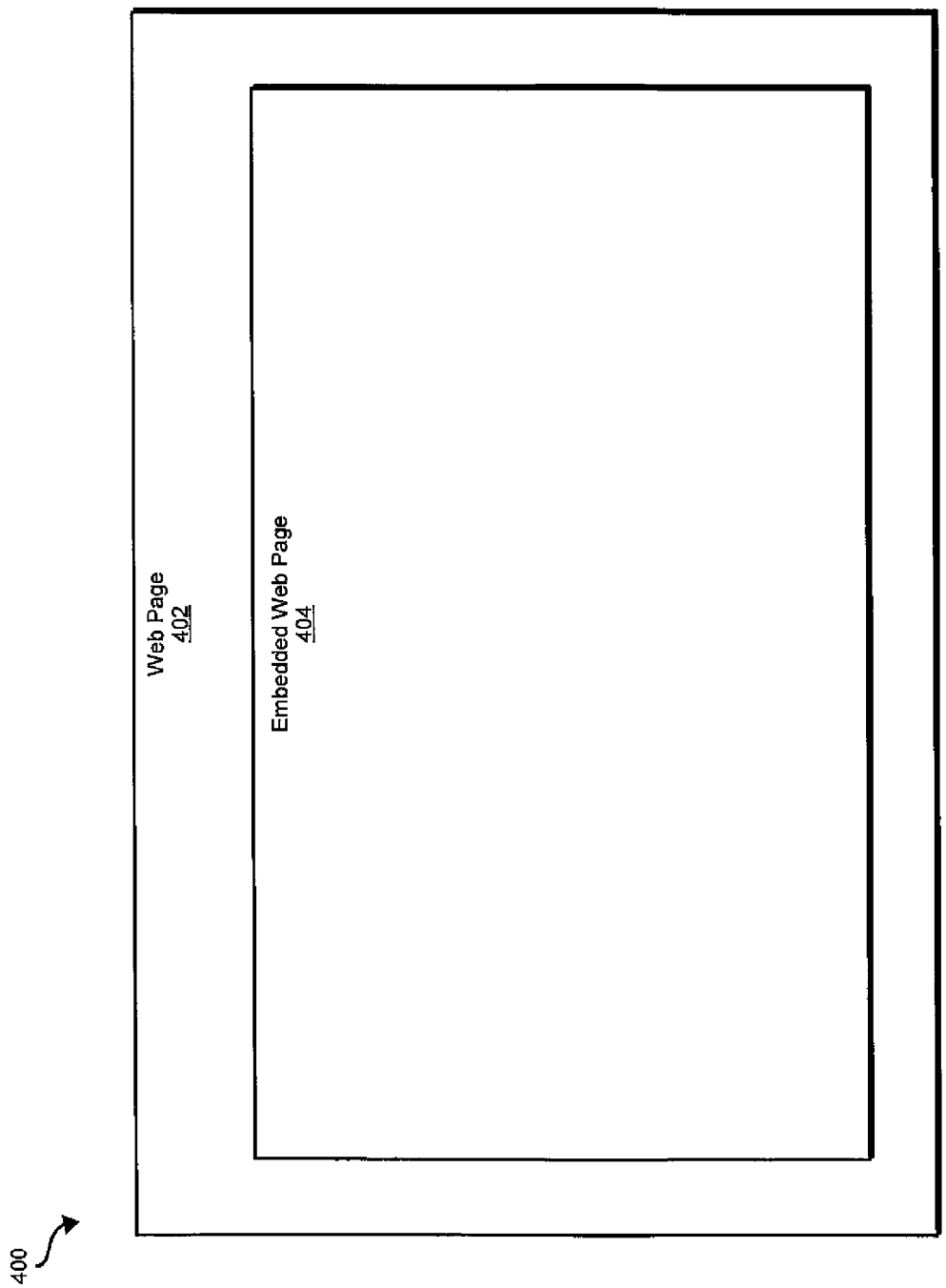
FIG. 4 is a block diagram of an exemplary web page for facilitating access to online services from untrusted computing devices according to at least one embodiment.

At step 310, at least a portion of the data received from the online service may be transmitted to the computing device. Data may be transmitted to the computing device in a variety of ways. For example, in certain embodiments transmitting data received from the online service to the computing device may comprise embedding a web page retrieved from the online service and transmitting the embedded web page to the computing device. For example, as illustrated in FIG. 4, in certain embodiments server 208 in FIG. 2 may, upon accessing a user account associated with online service 206, retrieve a web page from online service 206 and then embed that web page as an embedded web page 404 within an additional web page or sub frame 402. Web page 402, with embedded web page 404, may then be transmitted by server 208 to computing device 202.

As detailed above, server 208 in FIG. 2 generally represents any type or form of server-side computing device. In certain embodiments, server 208 may be used to proxy traffic between computing device 202 and online service 206. For example, as detailed above in connection with steps 308 and 310 of FIG. 3, server 208 in FIG. 2 may proxy requests from computing device 202 to online service 206 and/or data received from online service 206 to computing device 202. Accordingly, exemplary method 300 and exemplary system 200 may enable a user of an untrusted computing device, such as untrusted computing device 202 in FIG. 2, to be authenticated and access an online service, such as online service 206 in FIG. 2, without exposing authentication information to untrusted computing device 202.

Although not illustrated, in certain embodiments exemplary method 300 may further comprise, prior to retrieving the authentication information for the online service from the database, receiving user-account authentication information from the computing device. The phrase "user-account authentication information," as used herein, generally refers to information used to authenticate the identity of a user of an untrusted computing device, such as a user of computing device 202 in FIG. 2.

User-account authentication information may include both single-factor authentication information and multi-factor authentication information. The phrase "multi-factor authentication" may generally refer to an authentication process that requires at least two authentication factors. Authentication factors may include something a user knows (such as a password), something a user possesses (such as a smart card), or some identifiable physical characteristic of a user (such as a finger print). Accordingly, the phrase "multi-factor authentication information" may refer to information from at least two forms of authentication factors. Examples of multi-factor authentication information include, without limitation, passwords, PENS, hardware security tokens (such as USB tokens), smart cards (such as secure ID cards, mobile phone cards, and credit cards), biometric information (such as finger prints and retinal scans), or any other potentially useful information.

Upon receiving the user-account authentication information from computing device 202, server 208 may, by comparing the user-account authentication information received from computing device 202 with user-account authentication information stored in database 112, determine the authenticity of a user of computing device 202. Upon verifying the authenticity of the user of computing device 202, server 208 in FIG. 2 may proceed with the execution of steps 302-310 of exemplary method 300 in FIG. 3.

Figure 5:
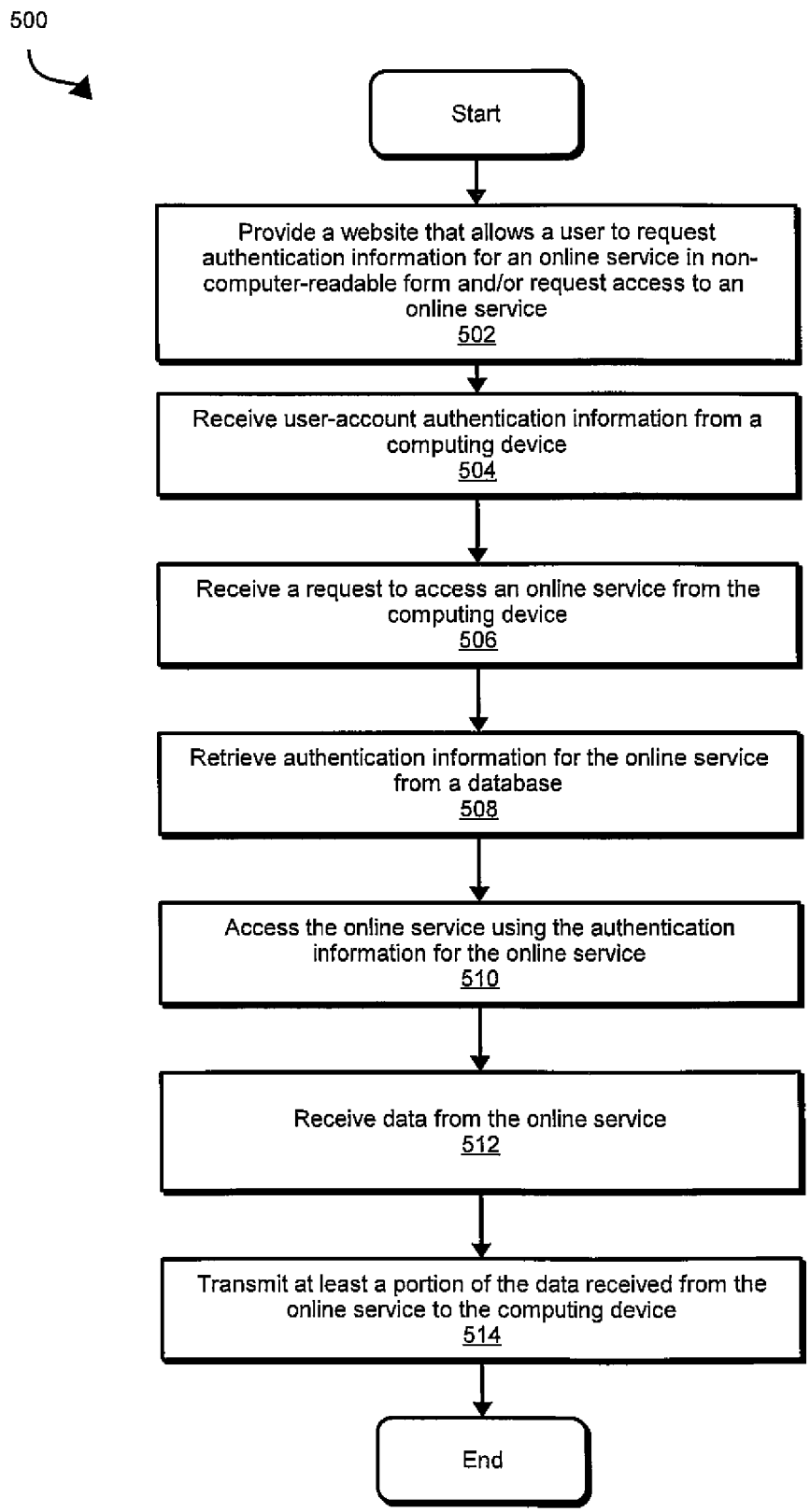
FIG. 5 is a flow diagram of an exemplary computer-implemented method for securely providing authentication information for an online service to an untrusted computing device according to certain embodiments.

As detailed above, embodiments of the instant disclosure may also include providing a website that allows a user to request non-computer-readable authentication information for an online service, request access to an online service, and/or add, edit, or delete authentication information for an online service. FIG. 5 is a flow diagram of an exemplary computer-implemented method 500 for providing a website that may facilitate online authentication from untrusted computing devices As illustrated in this figure, at step 502 a website may be provided that allows a user to interface with an online service (such as online service 206 in FIG. 2) and a proxy server for accessing the online service (such as server 208 in FIG. 2). The web page provided in step 502 may represent any type or form of web page. In certain embodiments, this website may allow a user to request authentication information for an online service, add authentication information for an online service to a database, edit authentication information for an online service stored in the database, delete authentication information for an online service from the database, and/or request access to an online service.

Figure 6:
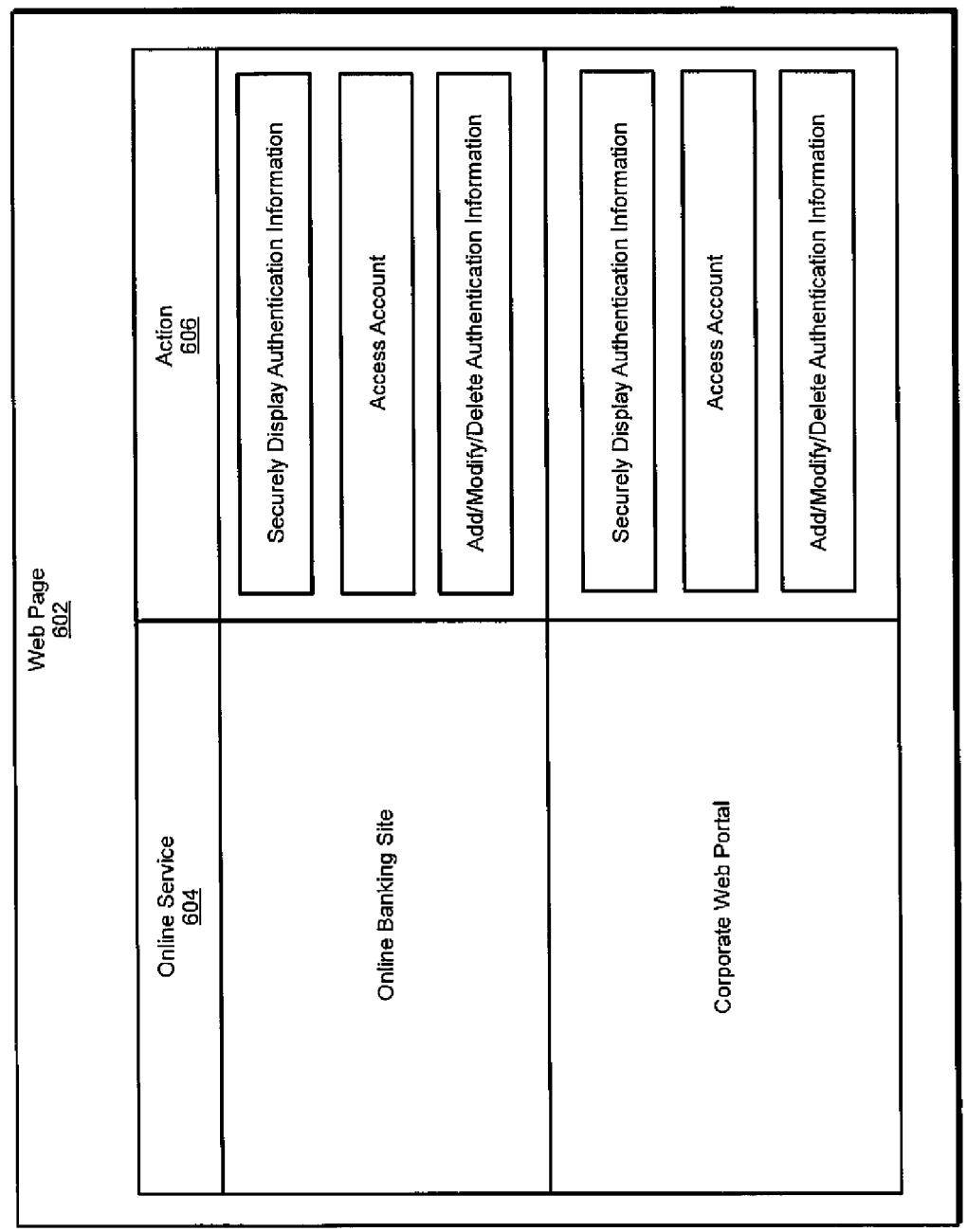
FIG. 6 is a block diagram of an exemplary web page for facilitating access to online services from untrusted computing devices according to at least one embodiment.

FIG. 6 is a block diagram of an exemplary web page 602 that may be provided in step 502 of exemplary method 500 in FIG. 5. As illustrated in this figure, web page 602 may allow a user to access one or more online services 604 and/or perform one or more actions 606 in connection with each online service 604. For example, a user may securely access an online banking site via a proxy server, such as proxy server 208 in FIG. 2, by requesting access to a user account associated with the online banking site by interfacing with web page 602. Similarly, a user may add, modify, or delete authentication information associated with the online banking site by interfacing with web page 602. In addition, and as will be discussed in greater detail below in connection with FIGS. 7 and 8, a user may request that authentication information (such as login information) for an online banking site be securely displayed.

Returning to FIG. 5, at step 504 user-account authentication information may be received from the computing device. As detailed above, this user-account authentication information may comprise multi-factor authentication information, such as a password in combination with a USB token. Upon receiving the user-account authentication information from the computing device, the proxy server, such as server 208 in FIG. 2, may verify the authenticity of a user of the computing device, such as computing device 202.

Upon verifying the authenticity of the user of the computing device, at step 506 the server may receive a request to access an online service from the computing device. For example, server 208 in FIG. 2 may receive a request to access online service 206 from computing device 202. At step 508, the server may retrieve authentication information for the online service from a database, such as database 112 in FIG. 1. At step 510, the server may access the online service using the authentication information for the online service retrieved from the database. For example, server 208 in FIG. 2 may access online service 206 using the authentication information for online service 206 retrieved from database 112.

At step 512, the server may receive data from the online service. For example, server 208 in FIG. 2 may retrieve a web page, such as web page 404 in FIG. 4, from online service 206. At step 514, the server may transmit at least a portion of the data received from the online service to the computing device. For example, server 208 in FIG. 2 may embed a web page, such as web page 404 in FIG. 4, retrieved from online service 206 within a sub frame, such as web page or sub frame 402, and then transmit the embedded web page to computing device 202. Upon completion of step 514 in FIG. 5, exemplary method 500 may terminate.

Figure 7:
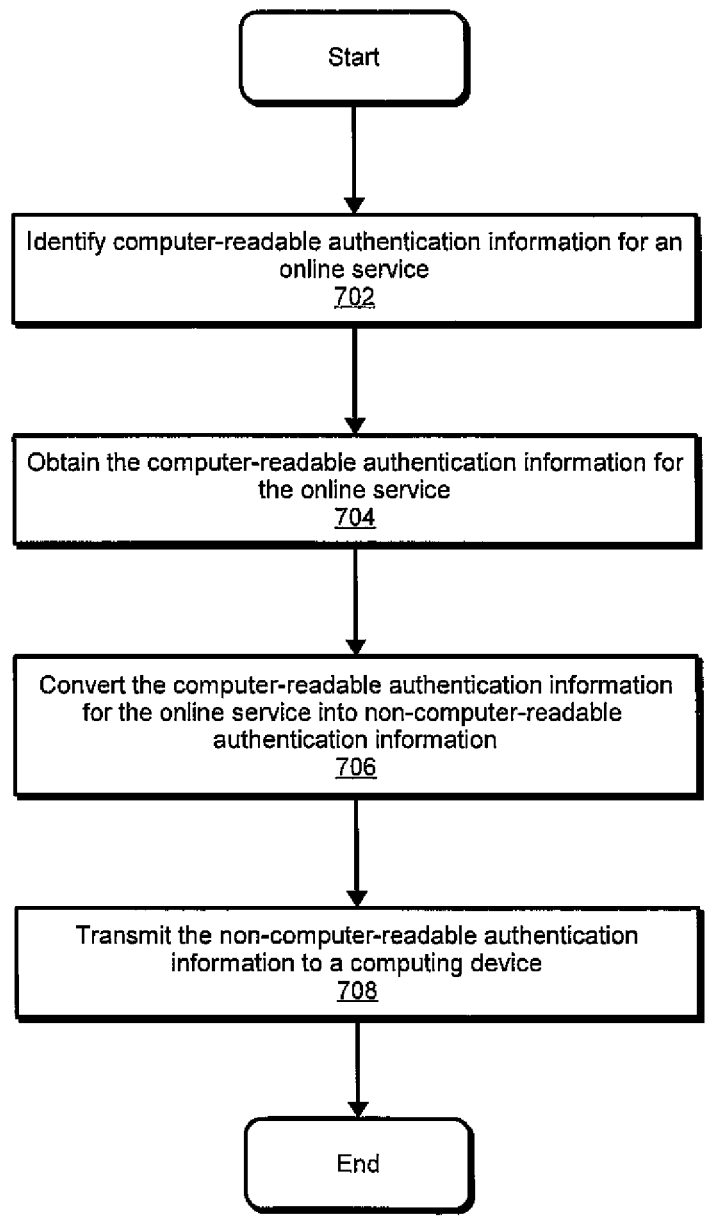
FIG. 7 is a flow diagram of an exemplary computer-implemented method for securely providing authentication information for an online service to an untrusted computing device according to an additional embodiment.

As detailed above, embodiments of the instant disclosure may also enable a user to securely retrieve login authentication information using an untrusted computing device. FIG. 7 is a block diagram of an exemplary computer-implemented method 700 for securely providing authentication information for an online service to an untrusted computing device, such as computing device 202 in FIG. 2. As illustrated in this figure, at step 702 a server, such as server 208 in FIG. 2, may identify computer-readable authentication information for an online service. Computer-readable authentication information may be identified in a variety of ways. For example, in certain embodiments, identifying computer-readable authentication information for online services may comprise searching a database, such as database 112 in FIG. 1, for computer-readable authentication information for the online service. For example, server 208 in FIG. 2 may, upon receiving a request from computing device 202 in FIG. 2 to provide authentication information for online service 206, search database 112 in FIG. 1 for computer-readable authentication information for online service 206.

At step 704, the server may obtain the computer-readable authentication information for the online service. This computer-readable authentication information may be obtained in a variety of ways. In certain embodiments, obtaining the computer-readable authentication information for the online service may comprise retrieving the computer-readable authentication information for the online service from the database. For example, server 208 in FIG. 2 may obtain computer-readable authentication information for online service 206 by retrieving the computer-readable authentication information for online service 206 from database 112 in FIG. 1.

At step 706, a conversion module, such as conversion module 108 in FIG. 1, may cause a proxy server, such as server 208 in FIG. 2, to convert the computer-readable authentication information for the online service retrieved from the database into non-computer-readable authentication information. The phrase "non-computer-readable authentication information" generally refers to information that may not be comprehended or processed by a computing device.

Computer-readable authentication information for the online service may be converted into non-computer-readable authentication information in a variety of ways. In certain embodiments, converting the computer-readable authentication information into non-computer-readable authentication information may comprise converting computer-readable text into a human-readable image, such as human-readable image 804 in FIG. 8. For example, a conversion module, such as conversion module 108 in FIG. 1, may cause a proxy server, such as server 208 in FIG. 2, to convert the computer-readable text "Walm" retrieved from database 112 in FIG. 1 into a human-readable image 804 in FIG. 8. In certain embodiments, human-readable image 804 may be in a format that prevents a computing device or a software application from extracting useful information (such as the authentication information "Walm") from the human-readable image.

Figure 8:
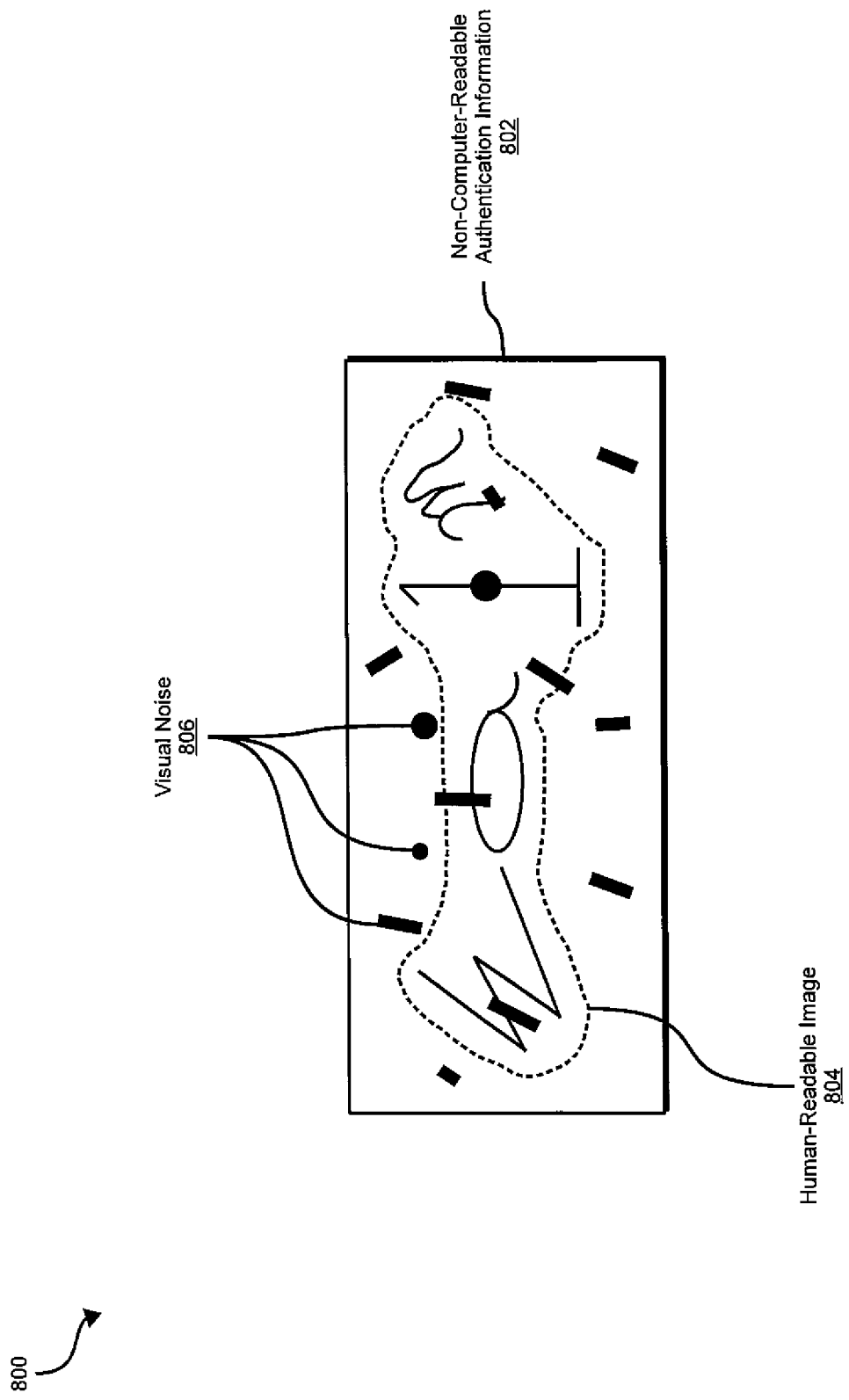
FIG. 8 is a block diagram of exemplary non-computer-readable authentication information according to certain embodiments.

Human-readable image 804 in FIG. 8 generally represents any type or form of image that may be read or comprehended by a human. Examples of human-readable image 804 include, without limitation, bitmaps, jpegs, tiffs, or any other image format. In certain embodiments, human-readable image 804 may display authentication information in a human-readable format that is unreadable by a computing device or a software application.

Converting the computer-readable authentication information into non-computer-readable authentication information in step 706 in FIG. 7 may also comprise adding visual noise. The phrase "visual noise" generally refers to information added to non-computer-readable authentication information, such as non-computer-readable authentication information 802 in FIG. 8, in order to prevent a computing device or software program from extracting useful information from the non-computer-readable authentication information. Examples of visual noise include, without limitation, various shapes and objects (such as lines, dashes, dots, or the like), background colors or patterns, or any other type of visual information that may be used to prevent a computing device or software program from extracting useful information from the non-computer-readable authentication information. For example, conversion module 108 in FIG. 1 may add visual noise 806 to human-readable image 804 in FIG. 8.

In certain embodiments, converting the computer-readable authentication information into non-computer-readable authentication information in step 706 in FIG. 7 may also comprise transforming at least a portion of a human-readable image. Human-readable images may be transformed in a variety of ways. For example, in certain embodiments transforming at least a portion of a human-readable image may comprise rotating at least a portion of the human-readable image, stretching at least a portion of the human-readable image, and/or tilting at least a portion of the human-readable image. For example, conversion module 108 in FIG. 1 may, after converting the computer-readable text "Walm" into a human-readable image 804 that is unreadable by a computing device, stretch, rotate, and/or tilt portions of human-readable image 804 to prevent a computing device or a software application from extracting useful information from human-readable image 804.

At step 708, the server may transmit the non-computer-readable authentication information to a computing device, such as computing device 202 in FIG. 2. The non-computer-readable authentication information may be transmitted to a computing device in a variety of ways. For example, in certain embodiments, server 208 may transmit the non-computer-readable authentication information to computing device 202 via network 204 for subsequent display by a display output of computing device 202. Upon completion of step 708 in FIG. 7, exemplary method 700 may terminate.

As illustrated in FIG. 8, non-computer-readable authentication information 802 may also comprise visual noise 806. The phrase "visual noise" generally refers to information added to non-computer-readable authentication information 802 in order to prevent a computing device or software program from extracting useful information from non-computer-readable authentication information 802. Examples of visual noise 806 include, without limitation, various shapes and objects (such as lines, dashes, dots, or the like), background colors or patterns, or any other type of visual information that may be used to prevent a computing device or software program from extracting useful information from non-computer-readable authentication information 802.

Figure 9:
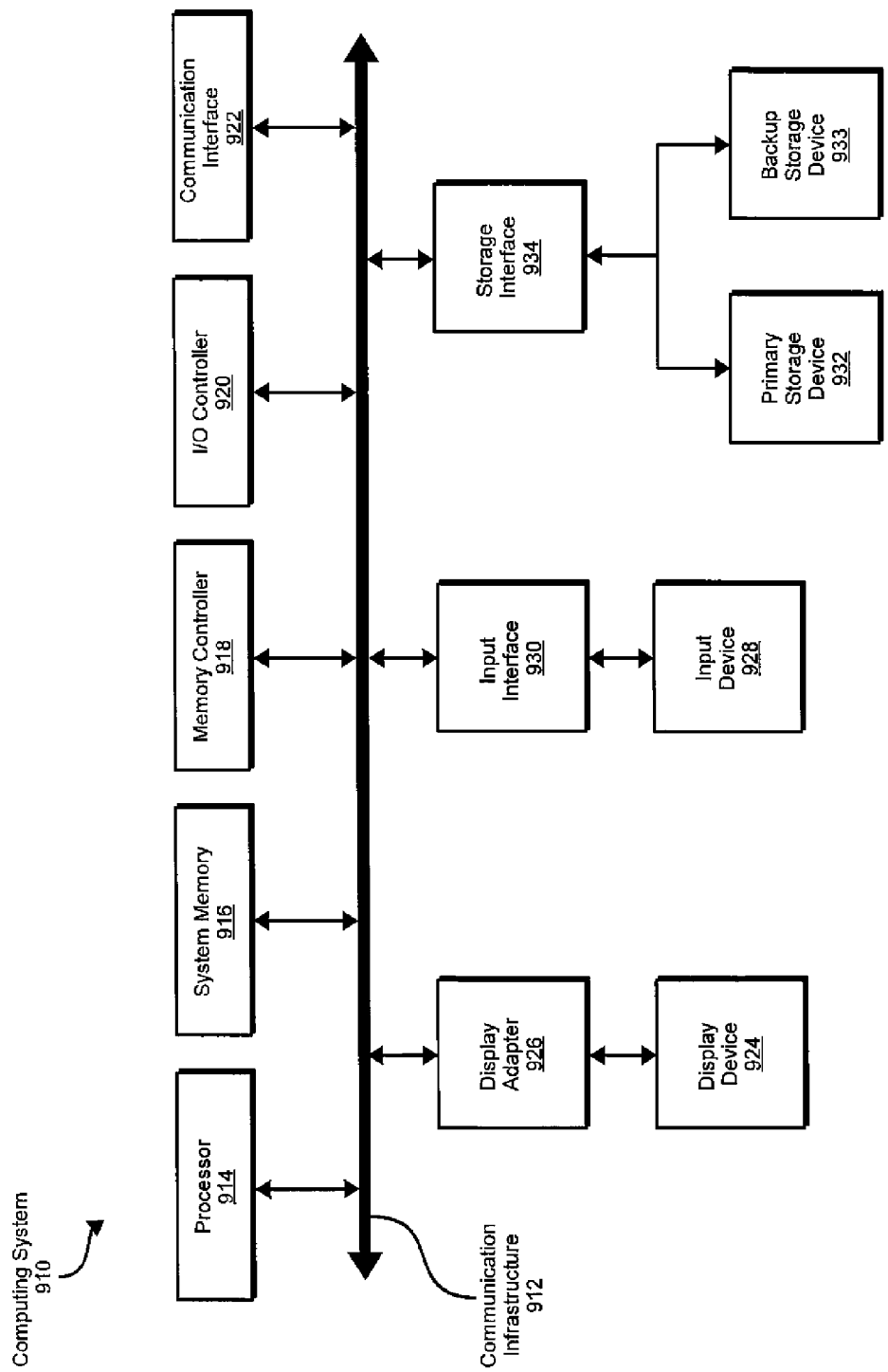
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the obtaining, identifying, receiving, retrieving, accessing, transmitting, logging in, converting, adding, transforming, rotating, stretching, tilting, and providing steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 918, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as obtaining, identifying, receiving, retrieving, accessing, transmitting, logging in, converting, adding, transforming, rotating, stretching, tilting, and providing.

I/O controller 920 generally represents any type or form of module capable of coordinating and/or controlling the input and output functions of a computing device. For example, in certain embodiments I/O controller may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the obtaining, identifying, receiving, retrieving, accessing, transmitting, logging in, converting, adding, transforming, rotating, stretching, tilting, and providing steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the obtaining, identifying, receiving, retrieving, accessing, transmitting, logging in, converting, adding, transforming, rotating, stretching, tilting, and providing steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the obtaining, identifying, receiving, retrieving, accessing, transmitting, logging in, converting, adding, transforming, rotating, stretching, tilting, and providing steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, the exemplary file systems disclosed herein may be stored on primary storage device 932, while the exemplary file-system backups disclosed herein may be stored on backup storage device 933. Storage devices 932 and 933 may also be used, for example, to perform and/or be a means for performing, either alone or in combination with other elements, one or more of the obtaining, identifying, receiving, retrieving, accessing, transmitting, logging in, converting, adding, transforming, rotating, stretching, tilting, and providing steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments descried and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
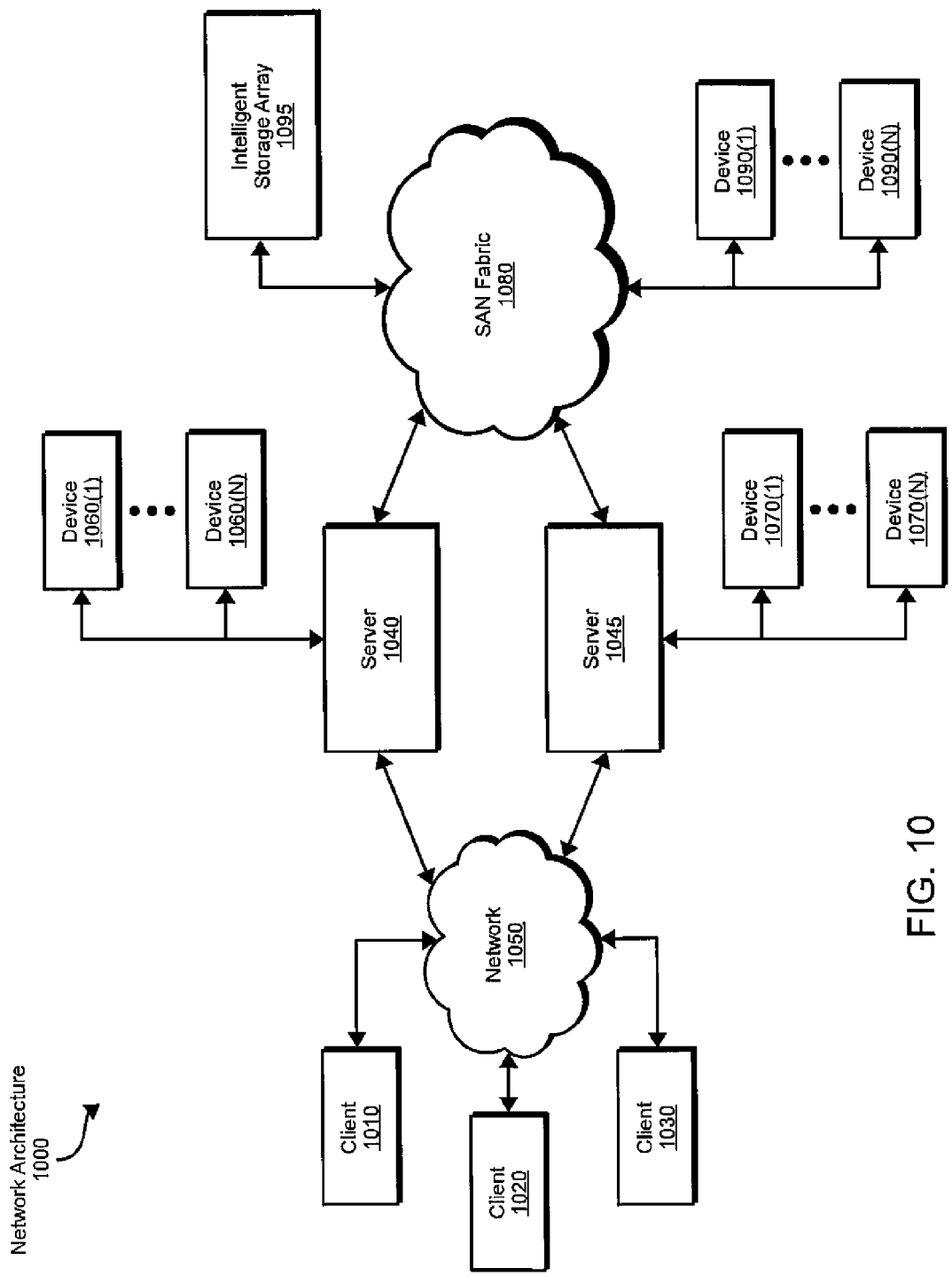
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1090(1)-(N) may be directly attached to server 1045. Storage devices 1060(1)-(N) and storage devices 1090(1)-(N) generally represent any type or form of storage device or medium capable of storing data and/or other computer-readable instructions. In certain embodiments, storage devices 1060(1)-(N) and storage devices 1090(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the obtaining, identifying, receiving, retrieving, accessing, transmitting, logging in, converting, adding, transforming, rotating, stretching, tilting, and providing steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. In one embodiment, this exemplary computer-implemented method may comprise receiving a request to access an online service from a computing device, retrieving authentication information for the online service from a database, accessing the online service using the authentication information for the online service, receiving data from the online service, and transmitting at least a portion of the data received from the online service to the computing device.

The method may also comprise, prior to retrieving the authentication information for the online service, receiving user-account authentication information from the computing device. In certain embodiments, the user-account authentication information may comprise multi-factor authentication information. Accessing the online service may comprise logging into the online service using the authentication information for the online service. In addition, receiving data from the online service may comprise retrieving a web page from the online service. Transmitting data received from the online service to the computing device may comprise embedding the web page retrieved from the online service and transmitting the embedded web page to the computing device.

The method may also comprise converting the authentication information for the online service into non-computer-readable authentication information and transmitting the non-computer-readable authentication information to the computing device. The non-computer-readable authentication information may comprise a human-readable image, and the method may further comprise adding visual noise to the human-readable image and/or transforming at least a portion of the human-readable image. In certain embodiments, transforming at least a portion of the human-readable image may comprise rotating at least a portion of the human-readable image, stretching at least a portion of the human-readable image, and/or tilting at least a portion of the human-readable image.

The method may also further comprise providing a website that allows a user to request non-computer-readable authentication information for an online service, add authentication information for an online service to the database, edit authentication information for an online service stored in the database, delete authentication information for an online service from the database, and/or request access to an online service. In certain embodiments, the authentication information for the online service may be associated with a user account for the online service. In addition, the computing device may be an untrusted computing device.

Computing system 910 and/or one or more of the components of network architecture 1000 may also perform and/or be a means for performing, either alone or in combination with other elements, a computer-implemented method for securely providing authentication information for an online service to an untrusted computing device that comprises identifying computer-readable authentication information for an online service, obtaining the computer-readable authentication information for the online service, converting the computer-readable authentication information for the online service into non-computer-readable authentication information, and transmitting the non-computer-readable authentication information to a computing device.

In certain embodiments, identifying the computer-readable authentication information for the online services may comprise searching a database for computer-readable authentication information for the online service in response to a request received from the computing device, In addition, obtaining the computer-readable authentication information for the online service may comprise retrieving the computer-readable authentication information for the online service from the database.

The non-computer-readable authentication information may comprise a human-readable image, and the method may further comprise adding visual noise to the human-readable image and/or transforming at least a portion of the human-readable image. In addition, transforming at least a portion of the human-readable image may comprise rotating at least a portion of the human-readable image, stretching at least a portion of the human-readable image, and/or tilting at least a portion of the human-readable image.

Computing system 910 and/or one or more of the components of network architecture 1000 may also represent all or portions of exemplary system 100 in FIG. 1. For example, computing system 1010 and/or one or more of the components of network architecture 1000 may represent portions of a system for facilitating online authentication from untrusted computing device, the system comprising a database for storing authentication information for an online service and an access module for receiving a request to access an online service from a computing device, retrieving authentication information for the online service from the database, accessing the online service using the authentication information for the online service, receiving data from the online service, and transmitting data received from the online service to the computing device.

In certain embodiments, the system may also comprise a conversion module for converting the authentication information for the online service into non-computer-readable authentication information. The system may also comprise a website module for providing a website that allows a user to request non-computer-readable authentication information for an online service from the database, add authentication information for an online service to the database, edit authentication information for an online service stored in the database, delete authentication information for an online service from the database, and/or request access to an online service. In at least one embodiment, the system may also comprise a user-authentication module for authenticating a user of the computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating online authentication from untrusted computing devices, at least a portion of the method being performed by a proxy server comprising at least one processor, the method comprising:
    receiving, at the proxy server, a request from an untrusted computing device to access an online service;
    retrieving, at the proxy server, authentication information for accessing the online service from a database;
    using the authentication information to log into the online service at the proxy server without exposing the authentication information to the untrusted computing device;
    proxying traffic between the online service and the untrusted computing device at the proxy server without exposing the authentication information to the untrusted computing device by:
        retrieving content from the online service at the proxy server;
        embedding the content retrieved from the online service at the proxy server within a web page;
        transmitting the web page containing the embedded content from the proxy server to the untrusted computing device.

2. The method of claim 1, further comprising, prior to retrieving the authentication information for accessing the online service, receiving user-account authentication information from the untrusted computing device.

3. The method of claim 2, wherein the user-account authentication information comprises multi-factor authentication information.

4. The method of claim 1, wherein retrieving the content from the online service at the proxy server comprises retrieving a web page from the online service at the proxy server.

5. The method of claim 1, further comprising:
    converting, at the proxy server, the authentication information for accessing the online service into a human-readable image; wherein the human-readable image is in a format that enables a user of the untrusted computing device to complete an authentication process required to access the online service but prevents computing devices from extracting useful information;
    transmitting the human-readable image from the proxy server to the untrusted computing device.

6. The method of claim 5, wherein the method further comprises at least one of:
    adding visual noise to the human-readable image;
    transforming at least a portion of the human-readable image.

7. The method of claim 6, wherein transforming at least a portion of the human-readable image comprises:
    rotating at least a portion of the human-readable image;
    stretching at least a portion of the human-readable image;
    tilting at least a portion of the human-readable image.

8. The method of claim 1, further comprising providing a website that allows a user to:
    request a human-readable image that is in a format that enables the user to complete an authentication process required to access an online service but prevents computing devices from extracting useful information;
    add authentication information for accessing an online service to the database;
    edit authentication information for accessing an online service stored in the database;
    delete authentication information for accessing an online service from the database;
    request access to an online service.

9. The method of claim 1, wherein the authentication information for accessing the online service is associated with a user account for the online service.

10. A computer-implemented method for securely providing authentication information for accessing online services to untrusted computing devices, at least a portion of the method being performed by a proxy server comprising at least one processor, the method comprising:
    receiving, at the proxy server, a request from an untrusted computing device for authentication information for accessing an online service;
    identifying, at the proxy server, computer-readable authentication information for accessing the online service;
    obtaining, at the proxy server, the computer-readable authentication information for accessing the online service;
    converting, at the proxy server, the computer-readable authentication information for accessing the online service into a human-readable image, wherein the human-readable image is in a format that enables a user of the untrusted computing device to complete an authentication process required to access the online service but prevents computing devices from extracting useful information;
    transmitting the human-readable image for accessing the online service from the proxy server to the untrusted computing device to enable the user of the untrusted computing device to complete the authentication process required to access the online service.

11. The method of claim 10, wherein:
    identifying the computer-readable authentication information for accessing the online service comprises searching a database for computer-readable authentication information for accessing the online service;
    obtaining the computer-readable authentication information for accessing the online service comprises retrieving the computer-readable authentication information for accessing the online service from the database.

12. The method of claim 10, wherein the method further comprises at least one of:
    adding visual noise to the human-readable image;
    transforming at least a portion of the human-readable image.

13. The method of claim 10, wherein transforming at least a portion of the human-readable image comprises:
    rotating at least a portion of the human-readable image;
    stretching at least a portion of the human-readable image;
    tilting at least a portion of the human-readable image.

14. A system for facilitating online authentication from untrusted computing devices, the system comprising:
- a database for storing authentication information for accessing an online service;
- an access module for:
  - receiving, at the proxy server, a request from an untrusted computing device to access the online service;
  - retrieving, at the proxy server, authentication information for accessing the online service from the database;
  - using the authentication information to log into the online service at the proxy server without exposing the authentication information to the untrusted computing device;
  - proxying traffic between the online service and the untrusted computing device at the proxy server without exposing the authentication information to the untrusted computing device by:
    - retrieving content from the online service at the proxy server;
    - embedding the content retrieved from the online service at the proxy server within a web page;
    - transmitting the web page containing the embedded content from the proxy server to the untrusted computing device;
- at least one processor configured to execute the access module.

15. The system of claim 14, further comprising a conversion module for converting the authentication information for accessing the online service into a human-readable image that is in a format that enables a user of the untrusted computing device to complete an authentication process required to access the online service but prevents computing devices from extracting useful information.

16. The system of claim 14, further comprising a website module for providing a website that allows a user to:
- request a human-readable image that is in a format that enables the user to complete an authentication process required to access an online service but prevents computing devices from extracting useful information;
- add authentication information for accessing an online service to the database;
- edit authentication information for accessing an online service stored in the database;
- delete authentication information for accessing an online service from the database;
- request access to an online service.

17. The system of claim 14, further comprising a user-authentication module for authenticating a user of the untrusted computing device.

* * * * *

UNITED STATES PATENT AND TRADEMARK OFFICE
CERTIFICATE OF CORRECTION

| | | |
|---|---|---|
| PATENT NO. | : 8,495,716 B1 | Page 1 of 1 |
| APPLICATION NO. | : 11/967473 | |
| DATED | : July 23, 2013 | |
| INVENTOR(S) | : Keith Newstadt and Shaun Cooley | |

It is certified that error appears in the above-identified patent and that said Letters Patent is hereby corrected as shown below:

On the title page item (75) should read:

Inventors: Keith Newstadt, Newton, MA (US);
Shaun Cooley, El Segundo, CA (US)

Signed and Sealed this
Fifth Day of November, 2013

Teresa Stanek Rea
*Deputy Director of the United States Patent and Trademark Office*